United States Patent
Nader et al.

(10) Patent No.: US 12,140,435 B2
(45) Date of Patent: Nov. 12, 2024

(54) ROUTE PLANNING BASED ON QOS REQUIREMENTS

(71) Applicant: Telefonaktiebolaget LM Ericsson (publ), Stockholm (SE)

(72) Inventors: Ali Nader, Malmö (SE); Niclas Palm, Svedala (SE); Jens Jansson, Eslöv (SE); Jagadeesh Arunachalam, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 168 days.

(21) Appl. No.: 17/612,485

(22) PCT Filed: May 5, 2020

(86) PCT No.: PCT/EP2020/062371
§ 371 (c)(1),
(2) Date: Nov. 18, 2021

(87) PCT Pub. No.: WO2020/233975
PCT Pub. Date: Nov. 26, 2020

(65) Prior Publication Data
US 2022/0228874 A1 Jul. 21, 2022

Related U.S. Application Data

(60) Provisional application No. 62/851,710, filed on May 23, 2019.

(51) Int. Cl.
*G01C 21/34* (2006.01)
*G08G 1/0968* (2006.01)
(Continued)

(52) U.S. Cl.
CPC ... *G01C 21/3407* (2013.01); *G08G 1/096811* (2013.01); *H04W 28/0268* (2013.01); *H04W 40/12* (2013.01)

(58) Field of Classification Search
CPC .................................. G01C 21/3407
See application file for complete search history.

(56) References Cited

U.S. PATENT DOCUMENTS 9,841,290 B1 12/2017 Bhatia et al.
11,359,926 B2 * 6/2022 Galan-Oliveras ........... G01C 21/3415
(Continued)

FOREIGN PATENT DOCUMENTS

EP 3203188 A1 8/2017
EP 3570133 A1 11/2019

OTHER PUBLICATIONS

Author Unknown, "A Glimpse into the Future: Continental demonstrates Predictive Connectivity Manager", Press Release, Continental AG, Mobile World Congress 2018, Feb. 26, 2018, 1-4.
(Continued)

*Primary Examiner* — Imran K Mustafa
(74) *Attorney, Agent, or Firm* — Weisberg I.P. Law, P.A.

(57) ABSTRACT

A method of a control node, operable in a communication network and comprising controlling circuitry configured to estimate quality of service (QoS) for geographical locations in the network is disclosed. The method comprises receiving (210, 310, 410, 510) from a user operable in the network a request signal indicative of a starting point and a destination point, acceptable quality of service during transit of the user from the starting point to the destination point and transit time; determining (211, 311, 411, 512, 516, 517) one or more routes from the starting point to the destination point based on transit time and on estimated QoS for a plurality of geographical locations of the one or more routes in view of the accepted QoS; providing (212, 316, 413, 512, 516) information of the determined one or more routes to the user; and dynamically updating (214, 215, 216, 314, 317) the determined one or more routes based on received information pertaining to experienced QoS associated with geographical locations pertaining to the determined one or more routes during transit of the user. Corresponding computer program product, and control node are also disclosed.

19 Claims, 4 Drawing Sheets

(51) Int. Cl.
    *H04W 28/02*     (2009.01)
    *H04W 40/12*     (2009.01)

(56) References Cited

U.S. PATENT DOCUMENTS

| | | |
|---|---|---|
| 2010/0330991 A1 | 12/2010 | Sydir et al. |
| 2014/0067257 A1 | 3/2014 | Dave et al. |
| 2014/0257695 A1 | 9/2014 | Annapureddy et al. |
| 2019/0086217 A1 | 3/2019 | Ibrahim et al. |
| 2019/0137287 A1 | 5/2019 | Pazhayampallil et al. |
| 2019/0174276 A1* | 6/2019 | Mineiro Ramos de Azevedo ...... H04W 4/38 |
| 2019/0383624 A1 | 12/2019 | Magzimof et al. |
| 2020/0033147 A1 | 1/2020 | Ahn |
| 2021/0306887 A1* | 9/2021 | Kim ..................... H04W 24/08 |

OTHER PUBLICATIONS

Huawei, "Predictable QoS and End-to-end Network Slicing for Automotive Use Cases", 5GAA WG2 Meeting, A-180057, Munich, Germany, Feb. 5-8, 2018, 1-4.

* cited by examiner

ROUTE PLANNING BASED ON QOS REQUIREMENTS

TECHNICAL FIELD

The present invention relates generally to the field of maintaining quality of service for users in communication networks, and more particularly to enablement of route planning in relation to quality of service for users in communication networks e.g., wireless networks.

BACKGROUND

The arrival of 5G (fifth generation) is revolutionizing the field of wireless communication. Fields that may benefit much from the expansion and development of 5G is e.g. the automobile industry. 5G will typically provide higher data rate, lower latency and increased capacity, which typically are key enablers for connected vehicles.

A semi-/fully autonomous vehicle is typically dependent on good network (NW) connection to reach a desirable level of road safety. For example, it is usually very important for a semiautonomous (i.e. remotely operated) vehicle to be reachable and responsive with low latency by an operator during its transit.

Furthermore, disregarding the operation of the vehicle as such, NW coverage outage or degraded Quality of Service (QoS) may also be typically annoying for travelers using online (e.g. infotainment) services in a vehicle, regardless of the vehicle being autonomous or not.

A potential solution for dealing with issues pertaining to e.g. limited QoS in the network or failing network connections is to increase the capacity along highly trafficked roads and use features such as network slicing for reserving bandwidth for connected vehicles.

However, network slicing alone does not always guarantee provisioning of end-to-end QOS required for connected vehicles. Furthermore, network slicing may typically need to be complemented with other technologies like e.g. edge computing.

Therefore, there is a need for alternative approaches (e.g., apparatuses and methods) that provide for reliable network services. Preferably, reliable network services may be provided to e.g. autonomous vehicles whose function is typically dependent on good network performance.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

A first aspect is a method of a control node. The control node may be operable in a communication network and comprise controlling circuitry configured to estimate quality of service, QoS, for geographical locations in the network.

The method comprises receiving from a user, operable in the network, a request signal. The request signal being indicative of a starting point and a destination point, acceptable quality of service during transit of the user from the starting point to the destination point and transit time.

The method also comprises determining one or more routes from the starting point to the destination point based on transit time and on estimated QoS for a plurality of geographical locations of the one or more routes in view of the accepted QoS.

The method also comprises providing information of the determined one or more routes to the user and dynamically update the determined one or more routes based on received information pertaining to experienced QoS associated with geographical locations pertaining to the determined one or more routes during transit of the user.

In some embodiments, the method may also comprise providing information to the user of the dynamical updating of the one or more routes.

In some embodiments, the method may further comprise receiving, from the user, an acknowledgement that the user has selected a route from the one or more routes to travel on. The method may further comprise dynamically update the selected route based on received information pertaining to experienced QoS associated with geographical locations pertaining to the selected route during transit of the user on the selected route, and informing the user of the dynamical updating of the selected route.

In some embodiments, the method may further comprise informing the user of the estimated QoS for geographical locations pertaining to the selected route for enabling the user to plan its data usage based on the estimated QoS.

In some embodiments, estimating the QoS for the plurality of locations of the at least one route is based on one or more of: historical data pertaining to experienced QoS associated with the plurality of locations of the at least one route; live data reports gathered internally or externally from other entities in the communication network; weather reports; time stamps; date stamps; network congestion; number of users present on the at least one route; expected user speed in transit; user location; planned events; Reference Signal Received power, RSRP; Received Signal Strength Indication, RSSI; and Reference Signal Received Quality, RSRQ.

In some embodiments, dynamically update the selected route during transit of the user from the starting point to the destination point is based on one or more of: network latency; live data reports gathered internally or externally from other entities in the communication network; weather reports; traffic reports; time stamps; date stamps; network congestion; number of users present on the selected route; user speed in transit; user location; planned events; experienced QoS by the user in relation to estimated QoS associated with geographical locations pertaining to the selected route; Reference Signal Received power, RSRP; Received Signal Strength Indication, RSSI; and Reference Signal Received Quality, RSRQ.

In some embodiments, the method may further comprise communicating with the communication network to request reservation of network resources to the user for providing the acceptable QoS during transit of the user from the starting point to the destination point.

In some embodiments, when at least one route cannot be determined based on that acceptable QoS cannot be met due to a coverage gap in the network, the method may further comprise redirecting other users to the coverage gap to form a group of users for bridging the coverage gap by utilizing device to device communication within the coverage gap.

In some embodiments, for providing the acceptable QoS, the method may further comprise one or more of: redirecting other users in the network; applying edge computing at one or more network nodes located in a geographical close location by the at least one route; decreasing travel speed of the user; and instructing the user to travel the from starting point to the destination point at another point in time.

In some embodiments, for providing acceptable QoS, the method may further comprise application of edge computing by determining that one or more network nodes are deployed in a geographical close location to the one or more routes and instructing to the determined one or more network nodes to run one or more computations associated with the determination of the acceptable QoS.

In some embodiments, the method may further comprise causing network load balancing by distributing suggested routes to a multitude of users traveling at the same time.

In some embodiments, the method may further comprise determining whether a user is a prioritised user and cause acceptable QoS by forcing of QoS enhancement, when it is determined that the user is a prioritised user.

In some embodiments, the method may further comprise forcing QoS enhancement by performing one or more of: requesting network resources from other users; applying edge computing; requesting reservation of bandwidth; instructing other users to stop data usage; and redirecting other users away from the determined one or more routes.

A second aspect is a computer program product comprising a non-transitory computer readable medium. The non-transitory computer readable medium may have stored there on a computer program comprising program instructions. The computer program may be configured to be loadable into a data-processing unit, comprising a processor and a memory associated with, or integral to, the data-processing unit. When loaded into the data-processing unit, the computer program is configured to be stored in the memory. The computer program, when loaded into and run by the processor is configured to cause the processor to execute method steps according to any of the methods described in conjunction with the first aspect.

A third aspect is a control node, operable in a communication network and comprising controlling circuitry configured to estimate quality of service, QoS, for geographical locations in the network. The controlling circuitry is configured to cause reception, from a user operable in the network, a request signal indicative of a starting point and a destination point, acceptable quality of service during transit of the user from the starting point to the destination point and transit time. In some embodiments, the controlling circuitry is configured to cause determination of one or more routes from the starting point to the destination point based on transit time and on estimated QoS for a plurality of geographical locations of the one or more routes in view of the accepted QoS.

In some embodiments, the controlling circuitry is configured to cause provision of information of the determined one or more routes to the user, and cause dynamical updating of the determined one or more routes based on received information pertaining to experienced QoS associated with geographical locations pertaining to the determined one or more routes during transit of the user.

In some embodiments, any of the above aspects may additionally have features identical with or corresponding to any of the various features as explained above for any of the other aspects.

An advantage with some embodiments is that alternative approaches that provide for reliable network services are provided. Preferably, reliable network services may be provided to e.g. autonomous vehicles whose function are typically dependent on good network performance.

An advantage with some of the embodiments described herein is that they improve user connection, since routes are determined based on actual experienced network latency and throughput.

Another advantage with some of the embodiments described herein is that the safety of e.g. autonomous vehicles is increased, particularly for vehicles that are remotely operated since the QoS will be more reliable during transit.

Another advantage with some of the embodiments described herein is that by maintaining routes based on actual experienced QoS in real time by users in the network, a route planning is enabled that provides for safer operation of e.g. autonomous users.

Another advantage with some of the embodiments described herein is that users may be noted well in advance of a potential drop in QoS, allowing for mitigating the consequences of the drop (the user may e.g. stop on its own instead of going off road or colliding)

Another advantage with some of the embodiments described herein is that network load and congestion is reduced since users and network resources will be more evenly spread in the network, and further avoid times and routes where the network load is potentially high.

Another advantage with some of the embodiments described herein is that reservation of bandwidth (or other suitable network resources) allows users to travel on the optimal route in terms of safety and speed.

Another advantage with some of the embodiments described herein is that by negotiating QoS in advance, the user avoids unforeseen network outage situations.

Another advantage with some of the embodiments described herein is that the connected user avoids getting stuck in coverage holes.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where required Quality of service (QoS) is maintained during transit on a route covered, at least partly, by a communication network As mentioned earlier, several entities will draw benefit from the development and expansion of e.g. the 5G networks. In particular, autonomous vehicles that are dependent on the network for receiving information pertaining to their operation will benefit.

Operation of autonomous vehicles are typically limited to areas that have network coverage which caters to their need for a certain QoS in terms of e.g. network latency and throughput. A loss in QoS may potentially lead to the vehicle being forced to slow down or even stop, in some cases manual assistance may be required to aid the vehicle if QoS during transit becomes too poor.

Another potential strategy is if a user can be provided with notifications of potential QoS changes. The 5GAAA work item description "Predictable QoS and End-to-end network Slicing for Automotive Use Cases", A-180057 presented on the 5GAA WG2 Meeting in Munich, 5-8 Feb, 2018 investigates whether it is possible to provide a user (e.g. an autonomous vehicle) with notification of potential QoS changes. While this is one possible approach, downgrading the QoS of a moving connected vehicle can possibly cause severe disruption in traffic and may hence not be too beneficial.

Figure 1:
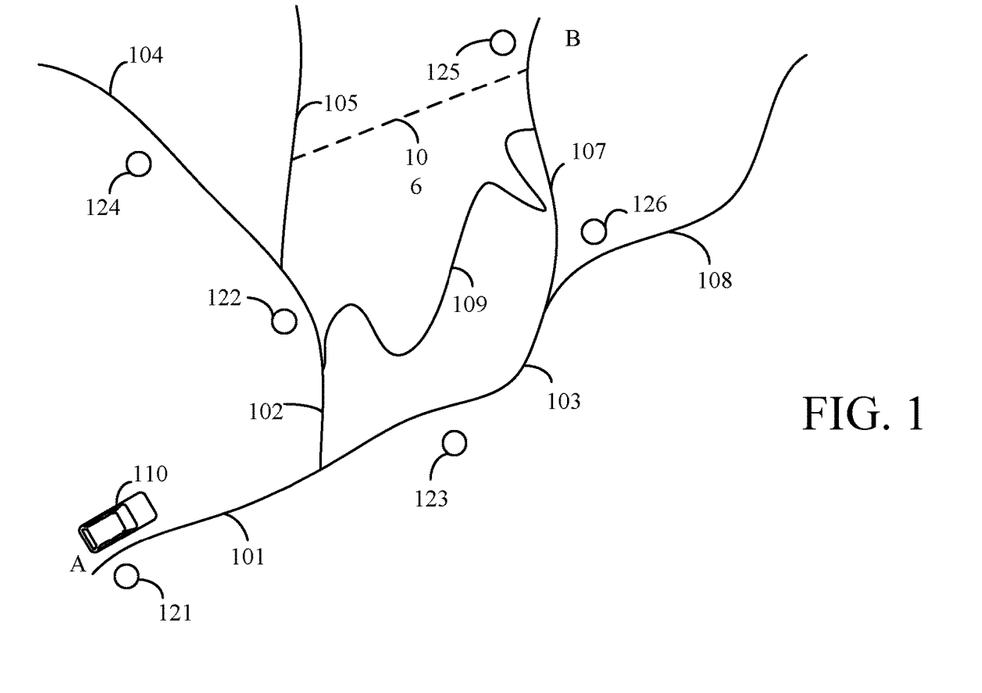
FIG. 1 is a schematic drawing illustrating example routes according to some embodiments.

FIG. 1 illustrates an example route scenario according to some embodiments. The user 110, wishes to travel from starting point A to destination point B. In this example, the user 110 is a car. However, the user 110 may be other types of vehicles (e.g. trucks, boats, busses, motorbikes, bikes, trains etc.) or other types of users (e.g. wireless communication devices such as mobile phones, smart phones, lap tops, surf pads, computers, network operators and end-users such as people, etc.) In some embodiments, the user 110 may comprise at least two users, the autonomous vehicle and a passenger using infotainment on his or her mobile phone. A control node may be deployed in order to assist the user to reach its desired destination point while maintaining acceptable QoS as well as arriving within an acceptable amount of time.

The control node is not shown in FIG. 1 and it may in some embodiments be integrated into a network node, or be a part of the user (the user may e.g. comprise controlling circuitry configured to communicate with the network), or be situated in a network cloud, or in a server in a core network. In some embodiments the control node is separate from the network, i.e. the control node is not a telecommunications node, but may belong to a separate operator or actor. In some embodiments, the control node may comprise or be configured to co-operate with a connectivity predictive logic, CPL, node. The CPL node may e.g. comprise circuitry enabling it to perform the calculations/estimations/determinations as described here in the following for determining suitable routes.

The control node is typically operable in a communication network. In FIG. 1, the communication network may e.g. be maintained by network nodes 121, 122, 123, 124, 125 and 126, which nodes are distributed within the network and located in a vicinity of physical road sections 101, 102, 103, 104, 105, 106, 107, 108 and 109.

The control node may comprise controlling circuitry which may be configured to estimate QoS for geographical locations in the network.

Geographical locations in the network may typically refer to sections of roads (or other infrastructure such as railroads, metros, airways, and seaways) or other geographical areas that are covered by the network.

In FIG. 1, geographical location may e.g. refer to physical road sections 101-109, wherein a geographical location may be a part of a road section (e.g. a part of road section 101 or road section 102, etc.) or the entire section (e.g. entire section 101, or the entire road corresponding to e.g. road sections 101, 103 and 108). A geographical location may e.g. be associated with a network node which provides coverage over the area.

The controlling circuitry of the control node may be configured to cause reception (e.g. may receive) from the user 110 being operable in the network (i.e. the user is capable of communicating with the network), of a request signal indicative of a starting point (starting point A) and a destination point (destination point B), acceptable quality of service during transit of the user 110 from the starting point to the destination point and transit time.

The user 110 may e.g. utilize a navigation service to communicate the request signal to the control node.

The transit time may e.g. indicate how long the time for transit (or travel, the terms may be used interchangeably in this disclosure) may be preferably, or how long it may be at maximum (preferable transit time and maximum transit time may in some embodiments coincide). The transit time may also be an indication of when the user plans on, or wishes to, travel from the starting point to the destination point (e.g. at a certain day, certain time of day etc.).

Acceptable QoS may comprise different parameters. The user may e.g. require a certain QoS during a certain point of time or location because (e.g.) an update is scheduled then which cannot be rescheduled, while during the remainder of the transit the required QoS is less.

QoS may comprise parameters associated with acceptable network latency and/or acceptable throughput.

In some embodiments, the acceptable quality of service may be a desired QoS. I.e. it is preferable that a certain QoS is provided but it is not necessary.

In some embodiments, the acceptable quality of service is a required QoS. I.e. it is typically necessary that the required QoS is maintained during (the whole, or in part of the) transit.

In some embodiments, if the user comprises more than two users, the first user may require better or higher QoS than the second user. In such case, the most stringent of the two users sets the QoS requirement to which the controlling node should adhere. If e.g. the first user is an autonomous vehicle (e.g. user 110 of FIG. 1) and the second user is a passenger on board the autonomous vehicle using infotainment services on e.g. a smart phone. The controlling node should base its route determination on the QoS requirement set by the autonomous vehicle. The smart phone may adapt its data usage based on that.

In some embodiments, the controlling node may even instruct the second user that at some geographical locations, the QoS will be low (e.g. close to, either above or under, the level of acceptable QoS for the first user) and that at those locations the smart phone (i.e. the second user) may have to stop using data.

Upon receiving the request signal from the user 110, the controlling circuitry of the control node may be configured to cause determination of (e.g., may determine) one or more routes from the starting point to the destination point based on transit time and on estimated QoS for a plurality of locations of the one or more routes in view of the accepted QoS.

For example, in view of FIG. 1, in some embodiments, user 110 may wish to travel from starting point A to destination point B at time T, and requires that QoS is maintained at a certain latency and/or throughput during the whole transit. Time T may e.g. in some embodiments relate to either or both of total transit time or start time for transit (it should be noted that the term time T may be used interchangeably with the term transit time in this disclosure, if not otherwise stated). Total transit time may e.g. be the total amount of time that the transit may take. Time for transit may e.g. relate to a date or hour for transit.

The control node may determine that network nodes 121, 123, 126 and 125 have enough network resources to maintain the required quality of service, during transit and hence determines that the route which follows road sections 101, 103 and 107 to destination point B is a possible route.

The control node may also determine that the route which follows road sections 101, 102, 109 and 107 also are covered by network nodes which provides the required QoS.

The controlling circuitry of the control node may then cause provision of information of the determined one or more routes to the user.

The provision of information may e.g. in some embodiments comprise expected travel time of the one or more routes. It may also in some embodiments comprise detailed information on the QoS service that is expected on the determined one or more route.

For example, the control node may determine that network node 123 may have a heavier load than network nodes 121 and 126, and that the user hence may experience QoS from 123 that is worse in relation to the QoS that is experienced in the coverage under network nodes 121, 126 while still being at an acceptable level, and inform the user of this.

In some embodiments, the control node may determine that network nodes do not have enough network resources to maintain the required quality of service at time T (e.g. due to heavy traffic at time T) but may be able to provide the resources at a later point in time that better meet the requirements and propose this later time to the user.

The controlling circuitry of the control node may further be configured to cause dynamic updating of the determined one or more routes based on received information pertaining to actual QoS associated with geographical locations pertaining to the determined one or more routes during transit of the user.

For example, in some embodiments, when determining suitable routes for the user to travel, the control node may utilize data received from the network in order to determine estimated QoS for the potential routes. The controlling circuitry may e.g. be configured to cause estimation of (e.g., may estimate) the QoS for the plurality of locations of the one or more route based on one or more of: historical data pertaining to experienced QoS associated with the plurality of locations of the at least one route, live data reports gathered internally or externally from other entities in the communication network, location of the user, weather reports, time stamps, date stamps, network congestion, number of users present on the one or more route, expected user speed in transit, Reference Signal Received power, RSRP, Received Signal Strength Indication, RSSI, and Reference Signal Received Quality, RSRQ Other entities in the network may e.g. be network nodes, other users, weather stations, etc.

Data pertaining to QoS may e.g. be gathered continuously from users present in the network and communicating with the control node. Other users which travel on the same road sections may e.g. report their experienced QoS to the control node which may store this data in order to be able to estimate (or determine) the QoS associated with a certain road section covered in the network.

In some embodiments, the controlling circuitry of the control node may be further configured to map received reports indicative of experienced QoS associated with geographical locations in the network with time stamps indicating when and/or what QoS was experienced. Such indications may either be requested from the users by the controlling node, or alternately be triggered by the users in case their experienced QoS deviates from controlling node's announced QoS on a geographical map. Based on such information the control node may determine that at certain times a certain node may be more congested and hence able to deliver less QoS than otherwise. This may typically occur in the morning and afternoon e.g. when workers (i.e., users) are traveling to and from their work place using the same routes.

The control node may also receive reports from the network nodes associated with a potential route indicative of their respective load and throughput.

The control node may also receive information from e.g. an operator relating to if certain events such as concerts, sports events, holidays, planned construction work etc. are going to take place. Such occasions may typically result in that some routes that normally have good network coverage and can provide a certain QoS become very crowded and may hence lead to a temporary decrease in the QoS, which the control node can take into consideration when determining routes based on transit time and acceptable QoS.

In some embodiments, the control node may further receive weather reports (e.g. from public weather stations) when determining QoS. Bad weather (such as rain, blizzards, thunder etc.) may e.g. have a negative impact on the QoS.

Furthermore, in some embodiments the controlling circuitry is further configured to cause reception of an acknowledgement from the user that the user has selected a route from the one or more routes to travel. The controlling circuitry may in response to this be configured to cause dynamical updating of the selected route based on received information pertaining to actual QoS associated with geographical locations pertaining to the selected route during transit of the user on the selected route and inform the user of the updating.

The controlling circuitry of the control node may e.g. in some embodiments be configured to cause the dynamical update for (e.g., may dynamically update) the selected route based on received information pertaining to actual QoS associated with geographical locations pertaining to the selected route during transit of the user based on one or more of network latency, live data reports gathered internally or externally from other entities in the communication network, weather reports, traffic reports, time stamps, date stamps, network congestion, number of users present on the selected route, user speed in transit, user location, experienced QoS by the user in relation to estimated QoS associated with geographical locations pertaining to the selected route, Reference Signal Received power, RSRP, Received Signal Strength Indication, RSSI, and Reference Signal Received Quality, RSRQ.

Hence, during transit the control node may monitor the experienced QoS both for a selected route which the user is traveling on, but also on experienced and/or expected QoS on other potential routes during transit of the user 110.

E.g., in FIG. 1, if the user 110 selects to travel on the route comprising road sections 101, 103 and 107, the control node may receive live data updates from the user 110 indicative of the experienced QoS. But the control node may also continue to gather QoS data associated with other potential routes (e.g. the route comprising road sections 101, 102, 109 and 107) in order to be able to redirect the user if the QoS on other routes are determined to be better than the current experienced QoS, or if there e.g. is a sudden drop in experienced QoS on the selected route.

FIG. 1 also shows a network coverage gap, illustrated by dashed route section 106. This is a route section where there is no network coverage, e.g. due to it being located in a tunnel, or high up in mountains or any other place where network coverage may be limited.

However, the control node may determine that the quickest way to reach destination point B is on the route comprising the road sections 101, 102, 105 and 106, and the coverage provided by network nodes 121, 122 and 125 provides the acceptable QoS except for on road section 106. The controlling circuitry of the control node may then in some embodiments be configured to redirect other users to road section 106 in order to bridge the gap. For example, in some embodiments, the controlling circuitry is further configured to cause redirection of other users to the coverage gap to form a group of users (i.e. a convoy, caravan or platoon of users) for bridging the coverage gap by utilizing device to device communication between the users within the coverage gap.

This is a strategy that may e.g. be utilized if the only available route comprises coverage gaps, or e.g. if a certain route is desired due to it providing the best QoS in relation to other available routes (apart from the coverage gap). Or if the route is the shortest and time of transit is important (the user may e.g. have a plan to catch, or may be a service vehicle such as an ambulance or police).

In some embodiments, in order to ensure that the acceptable QoS is maintained, the control node may be configured to communicate with the network nodes that are deployed close to the determined one or more routes and request that the network nodes reserve bandwidth for the user.

Reserving bandwidth allows users to travel on the optimal route (in terms of QoS and possibly time required for transit) in regard to safety and speed.

Furthermore, by negotiating the QoS in advance, is it more likely that the user avoids unforeseen network outage situations and/or that the user gets stuck in coverage holes.

Figure 2:
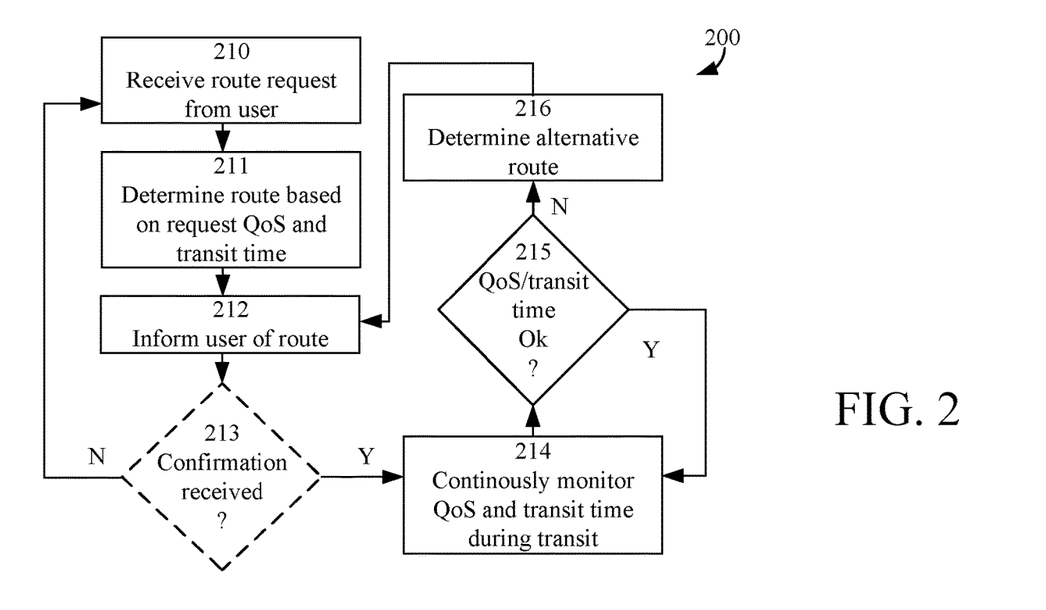
FIG. 2 is a flow chart illustrating an example method according to some embodiments.

FIG. 2 illustrates a method 200 of a control node, operable in a communication network and comprising controlling circuitry configured to estimate quality of service, QoS, for geographical locations in the network according to some embodiments. The method 200 may e.g. be carried out by the control node as described in conjunction with FIG. 1.

The method 200 starts in step 210 where the control node receives from a user (e.g. user 110 in FIG. 1) operable in the network, a request signal indicative of a starting point and a destination point, acceptable quality of service during transit of the user from the starting point to the destination point and transit time.

In step 211, the control node determines one or more routes from the starting point to the destination point based on transit time and on estimated QoS for a plurality of geographical locations associated with the one or more routes in view of the accepted QoS.

The transit time may e.g. indicate the total time the transit may take or it may additionally/alternatively indicate when in time the user wants to travel from the starting point to the destination point (as also indicated above in conjunction with FIG. 1). The transit time may e.g. indicate that the transit is to take place several days, weeks or even years in the future. Furthermore, in some embodiments, the transit time may be an expected or planned time period as determined by the control node, expressed with start and end points (in some embodiments further including a sequence of time points mapped to geographical locations associated with determined suitable routes). The user suitably just has to provide the start point. This may also be taken into consideration when determining suitable routs and estimating the QoS for the routes.

In step 212, the control node provides information of the determined one or more routes to the user. The control node may e.g. transmit information to an application launched by the user (e.g. a navigation service), where the possible routes may be indicated together with their associated estimated QoS. In some embodiments, the possible routes may be indicated together with their estimated QoS at determined time points. Hence, in some embodiments, the estimated QoS may be mapped and/or associated with (a plurality of) geographical locations pertaining to the one or more determined routes, based on the expected location of the user at the determined time points.

The control node may also indicate if certain road sections of the one or more route will experience worse or better QoS than the others, so the user will be aware of how the QoS may fluctuate during transit. The control node may also indicate that there are other estimated transit times in future that would better serve the requested QoS.

In steps 214, 215 and 216 the control node performs dynamic updating of the determined one or more routes based on received information pertaining to actual QoS associated with geographical locations pertaining to the determined one or more routes during transit of the user.

E.g. in step 214, the control node may continuously monitor experienced QoS. In some embodiments, the control node may also continuously monitor transit time (e.g. if transit time relates to how quickly the user wants to reach it destination).

Continuously monitoring the experienced QoS may in some embodiments comprise receiving live data reports from both the user during transit (experiencing current QoS on one of the one or more routes) or from other users traveling on the same, or on other routes in the network.

Monitoring experienced QoS may also comprise receiving reports from the network nodes deployed in the network (both network nodes that are deployed in a geographical close area to the one or more routes but also other network nodes in the network) pertaining to e.g. one or more of RSRP, RSSI, RSRQ, network latency, network throughput, node congestion, number of clients being served by the network node etc.

In some embodiments, monitoring experienced QoS may also comprise receiving location updates from the user for determining where on the route the user is currently located. In this case, the route may have to be recalculated, and the method proceeds directly to step 216, described below.

In some embodiments, monitoring experienced QoS may comprise receiving information from the user indicative of the users current velocity (i.e. user speed). High speed may e.g. negatively impact the QoS in some geographical areas.

In some embodiments, monitoring the experienced QoS may comprise receiving information e.g. from the user, the network nodes or the operator (or all) pertaining to date and time stamps In some embodiments, monitoring the experienced QoS may comprise reviewing historical data pertaining to experienced QoS associated with the plurality of locations of the one or more route.

In some embodiments, monitoring the experienced QoS may comprise receiving weather reports (from e.g. the operator or from public weather stations or similar). A reduction in experienced QoS may e.g. pertain to the user having entered a thunderstorm. However, the control node may determine based on e.g. weather reports that the user will soon leave the thunderstorm and that the QoS is expected to get better.

In some embodiments, monitor the experienced QoS may comprise receiving (from e.g. an operator associated with the control node) reports on events such as concerts, sports events, holidays, construction work etc.

All of the above described embodiments for continuously monitoring the experienced QoS may also in some embodiments be applicable when initially estimating the QoS for the one or more routes when a request signal from the user has been received comprising a starting point, a destination point, acceptable QoS and transit time.

Based on the above described embodiments for estimating/monitoring QoS, the control node may in step 215 determine if the QoS (and possibly also the transit time) is above the acceptable level (the user may also notify the control node if the user experience non-acceptable QoS).

When the control node determines in step 215 that the QoS is of an acceptable level (i.e. it is equal to or above the acceptable QoS indicated in the request signal from the user), Y-path out of 215, the method loops back to step 214.

When the control node determines in step 215 that the experienced QoS has dropped below acceptable, N-path out of 215, the method continues in step 216, where the control node may determine an alternative route for the user to travel on instead. Then the method continues in step 212 where the control node informs the user of the dynamical updating of the one or more route.

In some embodiments, the method 200 may further comprise optional step 213 (indicated optional by dashed lines), where after step 212 (in which the control node informs the user of the one or more determined routes) the control node receives from the user an acknowledgement that the user has selected a route from the one or more routes to travel on. Thus, when the user selects one of the determined one or more routes for transit (Y-path out of step 213) the method continues in step 214. However, when the user determines that none of the determined routes are satisfactory (N-path out of step 213) the method loops back to step 210 and the user may send a new request signal to the control node.

Figure 3:
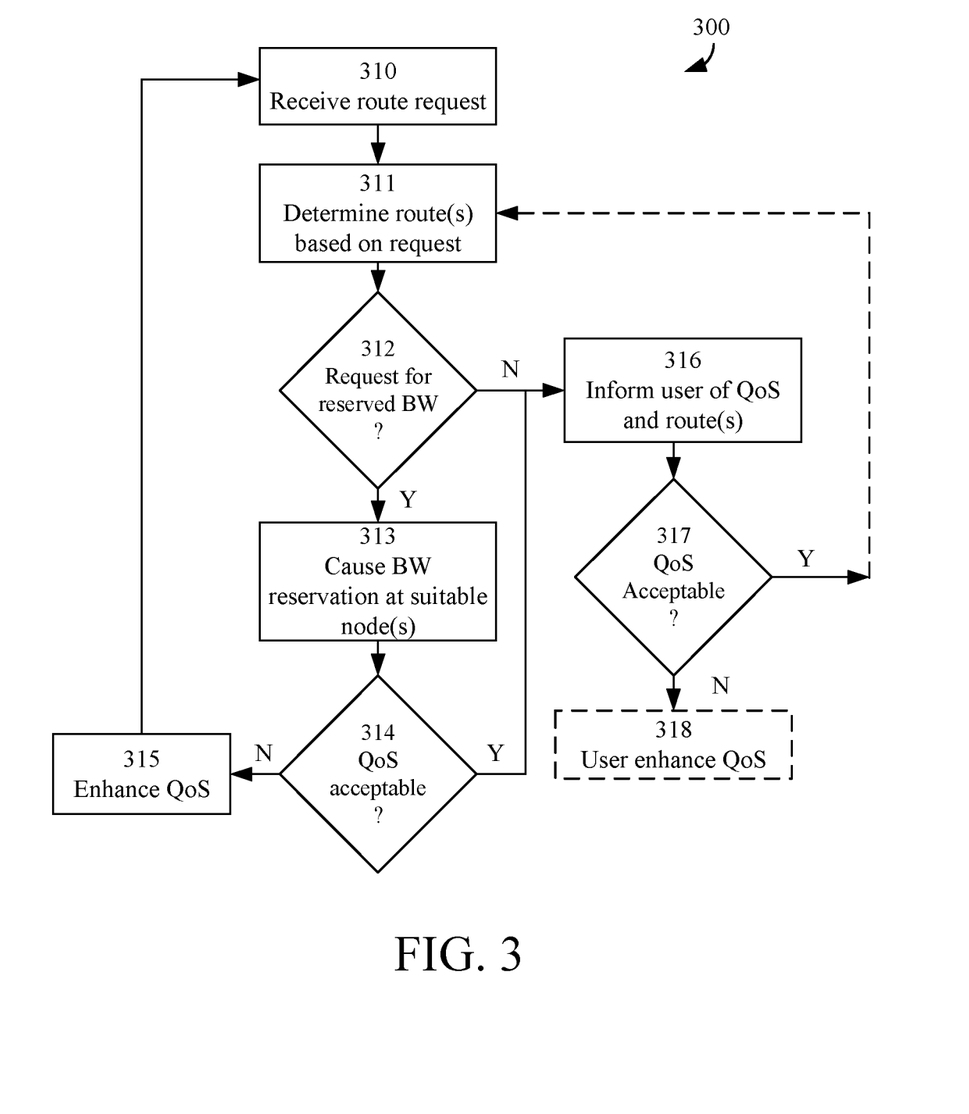
FIG. 3 is a flow chart illustrating an example method according to some embodiments.

FIG. 3 illustrates a method 300 carried out by a control node operable in a communication network and comprising controlling circuitry configured to estimate quality of service, QoS, for geographical locations in the network according to some embodiments.

The method 300 may e.g. be incorporated into the method 200 as described above. The method 300 may additionally or alternatively be carried out by the control node and applied in an environment as described in conjunction with FIG. 1. The control node carrying out method 300 may e.g. be the control node as described in any of FIGS. 1 and 2.

The method 300 starts in 310 where the control node receives a route request from a user (e.g. the user as described in any of FIG. 1-2) being operable in the communication network. The control node may e.g. receive from the user a request signal indicative of a starting point and a destination point, acceptable quality of service during transit of the user from the starting point to the destination point and transit time (compare with step 210 in method 200).

Then in step 311, the control node determines of one or more routes from the starting point to the destination point based on transit time and on estimated QoS for a plurality of locations of the one or more routes in view of the accepted QoS (compare with step 211 in method 200).

Hence, in some embodiments, step 311 may also comprise an additional (or alternative) step of estimating the QoS for a plurality of geographical locations of the one or more routes according to the embodiments described in conjunction with FIG. 2 for estimating the QoS.

In some embodiments, the request signal may comprise a request for reserved bandwidth. The user may e.g. request reservation of network resources if it is of importance that QoS is not impaired during the whole (or during part of) the transit.

In step 312, the control node may determine if the request signal also comprises a request for reserved network resources, e.g., bandwidth (BW).

When the control node determines in step 312 that there is a request for reserved bandwidth comprised in the request signal (Y-path out of 312) the control node may in step 313 cause reservation of bandwidth at suitable network nodes distributed in association to the determined one or more routes (e.g. the network nodes that are in close geographical vicinity to the determined routes and provide network coverage in the area).

E.g. in some embodiments, the control node communicates with the communication network to request reservation of network resources to the user for providing the acceptable QoS during transit of the user from the starting point to the destination point.

In some embodiments, the control node may e.g. transmit a request to the suitable network nodes for reservation of bandwidth to the user during transit time (or when the user enters the coverage area of the respective network node, or the network node which is requested to reserve bandwidth).

In step 314, the control node may determine if the network nodes were able to reserve bandwidth (e.g. by receiving and acknowledgement, ACK, from the network nodes which were requested to reserve). If the estimated QoS based on the reserved bandwidth is acceptable (Y-path out of 314), the method continues in step 316, where the control node informs the user of the determined one or more routes and their associated QoS (compare with step 212 in method 200). The control node may e.g. in some embodiments inform the user of the estimated QoS for geographical locations pertaining to the one or more route for enabling the user to plan its data usage based on the estimated QoS When the control node determines in step 314 that the QoS is not acceptable (N-path out of step 314) the method continues in step 315, where the control node enhances the QoS.

In some embodiments, enhancing QoS for providing acceptable QoS may comprise redirection of other users in the network. The control node may e.g. free up network resources by redirecting other users from the coverage of network nodes associated with the determined one or more routes.

In some embodiments, enhancing QoS for providing acceptable QoS may comprise decreasing travel speed of the user. E.g. the control node may instruct the user to temporarily decrease speed in order to receive better QoS. In some embodiments, the QoS may instruct the user to increase speed in order to arrive more quickly at a segment of the route which provides better QoS.

In some embodiments, enhancing QoS for providing acceptable QoS may comprise instructing the user to travel from the starting point to the destination point at another point of time. For example, the user may have asked to travel at a certain time or date, but the control node instructs the user to transit an hour earlier or later, or at another day (depending on the type of user, a prioritised user such as e.g. an ambulance should preferably not be redirected to travel on another day or time).

In some embodiments, enhancing QoS for providing acceptable QoS may comprise applying edge computing at one or more network nodes located by the determined one or more routes.

In some embodiments, a network node located by the determined one or more routes, means a network node which is physically deployed near, or in the geographical vicinity of a determined route. In other words, the network node provides coverage over the route and the user will possibly travel closer to the network node than to the control node during transit.

In some embodiments, applying edge computing at one or more network nodes located by the determined one or more routes may comprise determining that one or more network nodes are deployed in a geographical close location to the one or more routes and instructing the determined one or more network nodes to run one or more computations associated with the determination of the acceptable QoS.

Hence, the estimation of experienced as well as expected QoS and route planning may be performed closer to the user during transit which may reduce latency. The control node may e.g. download some of its algorithms to the network nodes deployed in the geographical close location to the one or more routes. The network nodes may then perform the calculations for route planning and QoS as described herein that the control node performs.

As mentioned above, utilising edge computing may reduce latency in the computations and provide a faster and more responsive method that enhances e.g. traffic security for autonomous vehicles.

In some embodiments, enhancing QoS for providing acceptable QoS may comprise applying network load balancing by causing distribution of suggested routes to a multitude of users traveling at the same time.

Hence, in order to better balance the network resources (i.e. avoid that some nodes become congested due to too many users in the same area, and that some nodes become almost redundant due to too few users in the area) the control node may determine whether or not a maximum number of users have been set on the same route. E.g., in the example of FIG. 1, if 500 users have requested to travel from point A to point B, the control node may distribute the users such that 300 users travel on road sections 101, 103 and 105, 50 users travel on road section 101, 102, 109 and 107, and 150 users travel on road sections 101, 102, 105 and 106.

Hence both network resources are distributed more evenly, as well as number of users on the roads. Larger roads may e.g. be able to better handle a larger amount of vehicles, whereas smaller roads may become congested more quickly if the same amount of vehicles were to be directed there.

Returning to FIG. 3 and the method 300. When the QoS has been enhanced, e.g. according to any of the above described embodiments, the method loops back to step 310, where the control node receives (either from the same user or from another) a new request signal comprising a route request (i.e. a starting point, a destination point, an acceptable level of QoS and a transit time).

When in step 314 it is determined that the QoS is acceptable (Y-path out of step 314), the method continues in step 316. The method also continues in this step, when in step 312 it is determined that no request for reserved bandwidth has been received (N-path out of 312).

In step 316, the control node informs the user of the determined one or more routes (compare with step 212 in the method 200). In some embodiments, the method 300 may also in step 316 inform the user of the estimated QoS for geographical locations pertaining to the one or more route (e.g. a route which the user has selected to travel on from the one or more routes) for enabling the user to plan its data usage based on the estimated QoS.

Then in step 317 the control node monitors experienced QoS and determines whether the experienced QoS is acceptable (compare with steps 214, 215 and 216 in method 200). In some embodiments, the user may also monitor the experienced QoS, and in optional step 318 (N-path out of 317) when the user determines that the QoS is below an acceptable level, the user may in some embodiments enhance QoS by e.g. slowing down, close applications that aren't needed, request manual assistance, adapt distance to other vehicles, request a new route, inform the control node of the inferior QoS, completely stop, etc.

In some embodiments, step 317 may additionally or alternatively comprise dynamical updating of the determined one or more routes based on received information pertaining to actual QoS associated with geographical locations pertaining to the determined one or more routes during transit of the user (compare with steps 214-216 in method 200). In some embodiments, if the QoS is determined to be acceptable in step 317, the method may optionally loop back to step 311, where the routes are determined again.

Although FIG. 3 illustrates the step of receiving a request for reserved bandwidth, and the step of reserving bandwidth, it should be noted that in some embodiments, these steps may be omitted. In the same manner, in some embodiments, the control node may determine that bandwidth should be reserved even if the user has not requested it.

Figure 4:
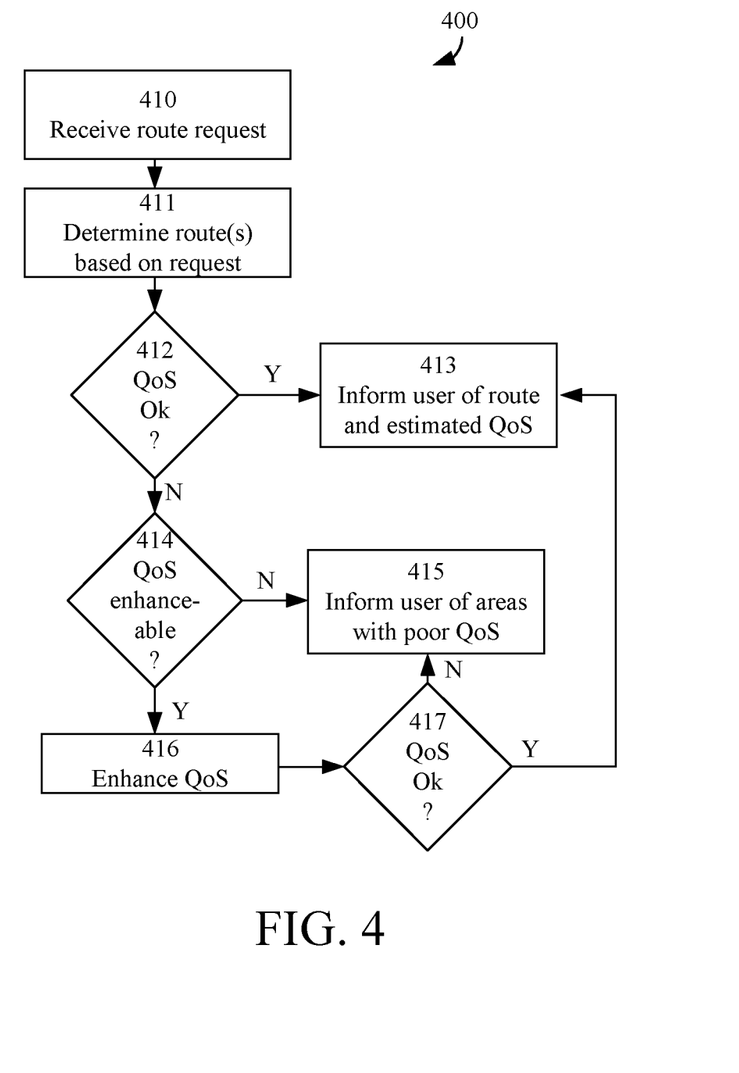
FIG. 4 is a flow chart illustrating an example method according to some embodiments.

FIG. 4 illustrates an example method of a control node, operable in a communication network and comprising controlling circuitry configured to estimate quality of service, QoS, for geographical locations in the network according to some embodiments. The method 400 may e.g. be carried out by the control node as described in conjunction with any of the FIGS. 1-3 and applied to the network scenario as described in FIG. 1.

The method 400 may further be incorporated with any of the methods as previously described in conjunction with FIGS. 2-3.

The method 400 starts in step 410, where the control node receives a route request from a user operable in the network.

A user operable in the network may e.g. mean that the user is capable of communicating with the network but is not necessarily attached to the network.

As noted, in step 410, the control node receives a request signal indicative of a starting point and a destination point, acceptable quality of service during transit of the user from the starting point to the destination point and transit time (compare with steps 210 and 310 of methods 200 and 300).

In step 411, the control node determines one or more routes from the starting point to the destination point based on transit time and on estimated QoS for a plurality of geographical locations of the one or more routes in view of the accepted QoS (compare with steps 211 and 311 of method 200 and 300).

The steps 412 and 414 are for estimating QoS associated with geographical locations pertaining to the one or more routes and may in some embodiments be carried out when determining suitable one or more routes, and may hence be performed before, or as steps in, the process of determining suitable routes.

In step 412, it is determined whether the estimated QoS for the one or more routes is acceptable with regards the acceptable QoS of request signal. When in step 412 it is determined that the estimated QoS for the one or more routes is acceptable (Y-path out of 412) the method continues in step 413, where the control node informs the user of the determined one or more routes (compare with steps 212 and 316 in methods 200 and 300). In some embodiments the control node may also inform the user of the estimated QoS associated with the determined one or more routes.

When in step 412, it is determined that the QoS is not acceptable (N-path out of 412), the control node may determine if it is possible to enhance the QoS for the determined routes (compare with step 315 in method 300). The control node may e.g. attempt to enhance the QoS using any of the embodiments described in conjunction with FIG. 3 for enhancing QoS.

When in step 414, it is determined that it is not possible to enhance QoS (N-path out of 414) the method continues in step 415, where the control node informs the user of the inferior QoS.

It may e.g. be determined in step 414, that QoS cannot be maintained over the whole route (e.g. due to a coverage gap, or a construction site which cannot be bypassed or any other reason which results in lower QoS) but is acceptable for most part of the transit. Then, the control node may inform the user of this so that the user is enabled to plan its data usage based on the expected QoS. The user may e.g. buffer instructions, or adapt its downloads based on the expected decreased QoS such that it doesn't affect the operation of the user.

The user may adapt the operations based on the predicted QoS. The user may e.g. slow down or stop to conclude its software download before continuing into areas with poor QoS.

In some embodiments, the user is redirected to routes and times for which the estimated QoS can be (better) met.

In some embodiments, other connected vehicle of less importance/less demanding QoS can be redirected in traffic (e.g. a policing vehicle is favoured over other vehicles).

In some embodiments, the control node may suggest to the application services to deploy/enable edge computing in sections of the route where QoS requirement could not be ordinarily met.

Furthermore, in some embodiments, step 415 may comprise informing the user of the determined one or more routes, even though the QoS associated with them may not be of acceptable level.

In some embodiments, when it is determined that the QoS cannot be enhanced, the control node may alternatively or additionally instruct the user to travel on a different point of time, or at a different date if applicable.

When in step 414 it is determined that the QoS can be enhanced (Y-path out of 414) the method continues in step 416 where the control node enhances the QoS (compare with step 315 of the method 300) e.g. by any of the embodiments described in conjunction with FIG. 3 or enhancing QoS.

Then the method continues in step 417 where the control node determines whether the enhancement was (or will be) successful and that the enhanced QoS is acceptable. When it in step 417 is determined that the enhanced QoS is not acceptable (N-path out of step 417) method continues in step 415.

When in step 417 it is determined that the QoS is acceptable (Y-path out of 417) the method continues in step 419 where the user is informed of the determined one or more routes and the estimated QoS pertaining to geographical locations of the one or more routes.

The method 400 may then continue (although not shown in FIG. 4, e.g. when either or both of steps 413 and 415 have been performed) with dynamical update of the determined one or more routes based on received information pertaining to actual QoS associated with geographical locations pertaining to the determined one or more routes during transit of the user (compare with FIG. 1 and method 200, 300 of FIGS. 2-3).

In some embodiments the route planning based on QoS and transit time provided by the control node as described in this disclosure may be utilized as a subscription service for users. I.e. a user may e.g. be a paying subscriber which gives the user priority over others in the network.

In some embodiments, the service may be provided without paying subscribers, but with some users still being prioritized users, such as e.g. service vehicles (ambulance, fire trucks, police, taxi, commuting vehicles, etc.).

In the case of prioritized users, it may be of greater importance that QoS is maintained at the acceptable level, and that transit time from starting point to destination point is kept as short as possible. Furthermore, it may not be suitable to instruct prioritised users that they should transit at another time or date. Instead the control node may force enhancement of QoS or reservation of bandwidth by instructing other users to reroute or even stop their data usage in order to free up resources to the prioritized users.

Figure 5:
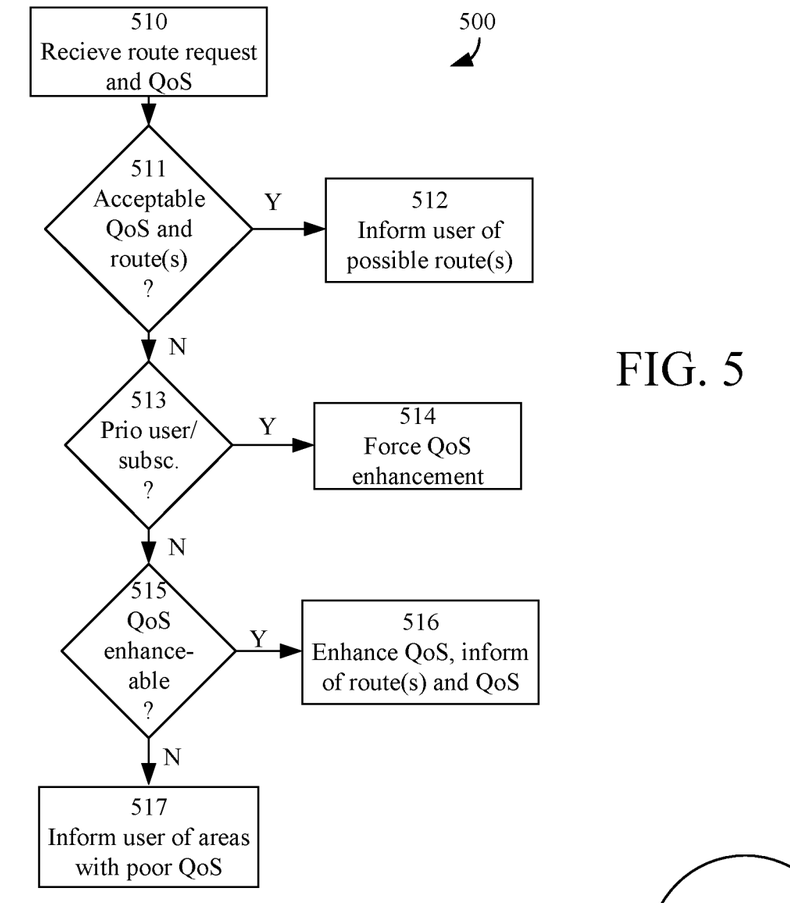
FIG. 5 is a flow chart illustrating an example method according to some embodiments.

FIG. 5 illustrates an example method 500 for a control node, operable in a communication network and comprising controlling circuitry configured to estimate quality of service, QoS, for geographical locations in the network according to some embodiments.

The method 500 may e.g. be carried out by the control node as described in conjunction with any of the FIGS. 1-4 and applied to the network scenario as described in FIG. 1.

The method 500 may further be incorporated with any of the methods as previously described in conjunction with FIGS. 2-4.

The method 500 starts in step 510, where the control node receives from a user operable in the network a request signal indicative of a starting point and a destination point, acceptable quality of service during transit of the user from the starting point to the destination point and transit time (compare with steps 210, 310 and 410 of methods 2-4).

In step 511, the control node determines one or more routes from the starting point to the destination point based on transit time and on estimated QoS for a plurality of locations of the one or more routes in view of the accepted QoS (compare with steps 211, 311 and 411-414 of method 2-4). The control node may e.g. determine if any of the possible routes provides acceptable QoS. When it is determined that there are one or more routes that provide acceptable QoS (Y-path out of 511) the method continues in 512 where the control node informs the user of the determined one or more routes and possibly the estimated QoS associated with geographical locations of the determined one or more routes (compare with steps 212, 316 and 413 of methods 2-4).

When in step 511, it is determined that the QoS associated with the determined one or more route is not acceptable (N-path out of 511), the method continues in step 513, where the control node determines whether the user is a prioritised user (and/or a paying subscriber).

In some embodiments, the user may e.g. indicate in its request signal to the control node that it is a prioritised vehicle. In some embodiments, the control node may enquire the user in order to determine whether it is a prioritised user.

If it in step 513 is determined that the user is a prioritised user (Y-path out of step 513), the method continues to step 514, where the control node causes acceptable QoS by forcing QoS enhancement (compare with steps 315, and 416 of methods 3-4).

The control node may e.g. force QoS enhancement by performing one or more of requesting network resources from other users, applying edge computing, requesting reservation of bandwidth, instructing other users to stop data usage, and redirecting other users away from the determined one or more route By force it is typically meant that the prioritised user will receive its acceptable QoS on the expense of other users QoS, where some users may even be taken out of traffic if needed. Hence other user's QoS may be degraded to a non-acceptable level in order to ensure the QoS of the prioritised user. The control node may e.g. force enhancement by redirecting other users, or instruct other users to stop data usage, or request bandwidth reservation from the network node, or apply edge computing or any of the other embodiments described above for QoS enhancement.

If it in step 513 is determined that the user is not a prioritised user (N-path out of 513) the control node may determine in step 515 if it is possible to enhance the QoS for the determined one or more routes without doing it on the expense of other users (i.e. not having to degrade the QoS for other users below their acceptable level, e.g. by simply redirecting other users, apply edge computing, bridge a coverage gap or according to any of the other described embodiments for QoS enhancement).

If in step 515 it is determined that the QoS can be enhanced (Y-path out of 515), the method continues in step 516 where the control node enhances the QoS and inform the user of the one or more routes and possibly the associated QoS (compare with steps 212, 316, 413 of methods 2-4).

If in step 515 it is determined that the QoS cannot be enhanced to an acceptable level (N-path out of 515) the method continues in step 517 where the control node informs the user of areas (i.e. routes or part of routes) where the QoS is not acceptable (compare with step 415 of method 400).

The method 500 may then continue (although not shown in FIG. 5, e.g. when either or all of steps 512, 514, 516, 517 have been performed) with dynamical update of the determined one or more routes based on received information pertaining to actual QoS associated with geographical locations pertaining to the determined one or more routes during transit of the user (compare with FIG. 1 and methods 200, 300, 400 of FIGS. 2-4).

Figure 6:
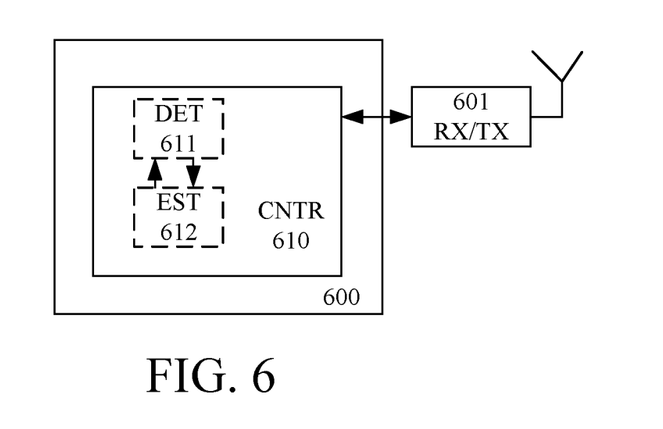
FIG. 6 is a block diagram illustrating an example apparatus according to some embodiments.

FIG. 6 illustrates an example apparatus 600 according to some embodiments. The example apparatus 600 may e.g. comprise or be comprised in a control node operable in a communication network. The apparatus 600 may e.g. be the control node as described in conjunction with any of the FIGS. 1-5.

The apparatus 600 comprises (or is connectable to) a transceiver (RX/TX) 601. The transceiver unit may comprise an antenna for receiving and transmitting signals. Although FIG. 6 illustrates the transceiver unit as being attached outside the apparatus, it should be understood that the transceiver unit could in some embodiments be integrated into the apparatus 600.

The apparatus 600 also comprises controlling circuitry (CNTR) 610 configured to estimate quality of service, QoS, for geographical locations in the network. In some embodiments, the apparatus may comprise a network node. In some embodiments, the apparatus 600 may comprise or be configured to co-operate with a connectivity predictive logic, CPL, node. The CPL node may e.g. comprise circuitry enabling it to perform the calculations/estimations/determinations as described here in the following for determining suitable routes.

The controlling circuitry 610 may in some embodiments be configured to cause reception (e.g. via the transceiver 601) from a user operable in the network a request signal indicative of a starting point and a destination point, acceptable quality of service during transit of the user from the starting point to the destination point and transit time (e.g. by causing the transceiver unit 601 to receive).

The user may e.g. be the user as described in conjunction with any of the FIGS. 1-5.

In some embodiments, the controlling circuitry 610 may be configured to cause determination (e.g. may be configured to determine) of one or more routes from the starting point to the destination point based on transit time and on estimated QoS for a plurality of geographical locations of the one or more routes in view of the accepted QoS.

To this end the controlling circuitry 610 may comprise, or be otherwise associated with (e.g. connectable to or connected to), a determiner (DET), e.g. determination circuitry or a determination module 611. The determiner 611 may be configured to determine the one or more routes from the starting point to the destination point based on transit time and on estimated QoS for a plurality of geographical locations of the one or more routes in view of the accepted QoS.

In some embodiments, the controlling circuitry 610 may comprise or be otherwise associated with (e.g. connectable to or connected to), an estimator (EST), e.g. estimation circuitry or an estimating module 612. The estimator 612 may e.g. be configured to estimate (and or determine) QoS, both expected and/or actual experienced, for a plurality of geographical locations of the one or more routes in view of the accepted QoS.

In some embodiments, the controlling circuitry 610 may be configured to cause provision of information of the determined one or more routes to the user (e.g. by transmitting using the transceiver 601) and dynamical updating of the determined one or more routes based on received information pertaining to experienced QoS associated with geographical locations pertaining to the determined one or more routes during transit of the user (e.g. by engaging the transceiver 601 to receive reports from users in the network, the estimator 612 to analyse the received reports in terms of QoS and e.g. transit time, and the determiner 611 for updating the routes based on the received information).

Furthermore, in some embodiments, the controlling circuitry 610, is configured to cause (performance of) the method steps as described in conjunction with any of the methods 200-500 of FIGS. 2-5.

Figure 7:
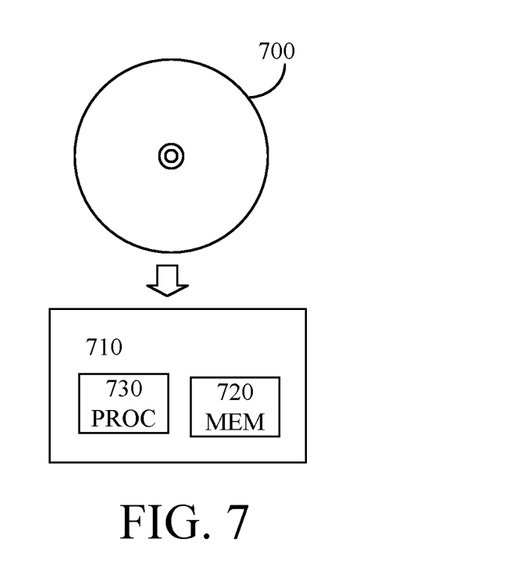
FIG. 7 is a block diagram illustrating an example computer program product according to some embodiments.

FIG. 7 illustrates a computer program product comprising a non-transitory computer readable medium 700, wherein the non-transitory computer readable medium 700 has stored there on a computer program comprising program instructions. The computer program is configured to be loadable into a data-processing unit 710, comprising a processor (PROC) 730 and a memory (MEM) 720 associated with or integral to the data-processing unit. When loaded into the data-processing unit 710, the computer program is configured to be stored in the memory 720, wherein the computer program, when loaded into and run by the processor 730 is configured to cause the processor to execute method steps according to any of the methods described in conjunction with the FIGS. 2-5.

As described herein a user may also adapt its behaviour based on the received route planning with associated QoS (compare e.g. with step 318 of method 300).

E.g. in some embodiments, the user may receive an indication from the control node that there are possible routes, but that the QoS associated with these routes may be inferior during the entire route, or during sections of the route.

E.g., if again turning to FIG. 1. The user 110 may be informed by the control node (after/during it has performed any of the methods described e.g. in conjunction with any of the FIGS. 2-5), that routes comprising road sections 101, 103, 107, and road sections 101, 102, 109 and 107 are available, but that the accepted QoS cannot be maintained on e.g. part of road section 103 and 109.

The user may thus be aware of the sections where the QoS will decrease. In some embodiments, the control node may also inform the user when the user is estimated to arrive at the section having decrease QoS.

Hence, the user is able plan its data usage based on the estimated QoS. The user 110 may e.g. slow down or stop completely when arriving at the sections with decreased QoS. The user may in such situation request manual assistance, e.g. if it is an autonomous vehicle, it may request that a human driver takes over operation.

In some embodiments, the user may e.g. light up a sign indicating to other users that it is unreliable and that other users should keep a distance and be cautious.

Furthermore, in some embodiments, any user in the network (i.e. both user 110 and other present users, not shown) may report experienced QoS for their current location. In some embodiments, the control node may announce to the user in the network what it estimates the QoS pertaining to a certain geographical location to be (i.e. how much latency and/or throughput), and a user that is currently at that certain geographical location may notify the control node if the user detects that the experienced QoS is less than the QoS the control node has estimated.

Hence, in some embodiments, the controlling circuitry of the control node may be configured to report estimated QoS of geographical locations pertaining to the one or more routes to other users operating in the network.

In some embodiments, a user configured to operate in a wireless communication network and requiring transit from a starting point to a destination point at a transit time and with an acceptable QoS may comprise controlling circuitry configured to cause transmission of a request signal comprising the starting point, the destination point, acceptable QoS and transit time.

The controlling circuitry may be further configured to cause reception from the control node of information indicative of one or more route for transit between the starting point and the destination point.

In some embodiments, the controlling circuitry may be further configured to cause the reception of estimated QoS of geographical locations pertaining to the one or more route.

In some embodiments, the controlling circuitry may be further configured to cause adaption of data usage of the user based on the received estimated QoS.

In some embodiments, the controlling circuitry may be further configured to cause reporting of experienced QoS to the control node.

In some embodiments, the controlling circuitry may be configured to cause reporting of gaps in network coverage to the control node.

In some embodiments, the controlling circuitry is further configured to cause reception of instructions from the control node indicative of that the user is to redirect to a certain geographical location and utilise device to device communication.

The disclosure herein has described embodiments pertaining to dynamic route planning based on quality of service and transit time in a wireless communication network. An advantage with some of the embodiments described herein is that they improve user connection, since routes are determined based on network latency and throughput.

The safety of e.g. autonomous vehicles is increased, particularly for vehicles that are remotely operated since the QoS will be more reliable during transit.

By maintaining routes based on actual experienced QoS in real time by users in the network, a route planning is enabled that provides for safer operation of e.g. autonomous users.

Users may be noted well in advance of a potential drop in QoS, allowing for mitigating the consequences of the drop (the user may e.g. stop on its own instead of going off road or colliding) Network load and congestion is reduced since users and network resources will be more evenly spread in the network, and further avoid times and routes where the network load is potentially high.

Reservation of bandwidth allows users to travel on the optimal route in terms of safety and speed.

By negotiating QoS in advance, the user avoids unforeseen network outage situations.

The connected user avoids getting stuck in coverage holes.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium (in some embodiments a non-transitory computer readable medium) such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 2-5.

Reference has been made herein to various embodiments. However, a person skilled in the art would recognize numerous variations to the described embodiments that would still fall within the scope of the below set of embodiments. For example, the method embodiments described herein describes example methods through method steps being performed in a certain order.

However, it is recognized that these sequences of events may take place in another order without departing from the scope of the below set of embodiments. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the below set of embodiments.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the below set of embodiments are intended to be embraced therein.

The invention claimed is:

1. A method of a control node, operating in a communication network and comprising controlling circuitry configured to estimate quality of service (QOS) for geographical locations in the network, wherein the method comprises:
    receiving, from a user device in the communication network, a request signal indicative of a starting point, a destination point, an acceptable QoS for communications between the user device and the communication network during transit of the user device from the starting point to the destination point, and a transit time;
    determining one or more routes from the starting point to the destination point based on the transit time and on estimated QoS for communications between the user device and the communication network for a plurality of geographical locations of the one or more routes, in view of the acceptable QoS;
    providing information of the determined one or more routes to the user device;
    dynamically updating the determined one or more routes based on received information pertaining to experienced QoS associated with geographical locations pertaining to the determined one or more routes during transit of the user device; and
    based on at least one route being unable to be determined based on the acceptable QoS not being met due to a coverage gap in the network, redirecting other user devices to the coverage gap to form a group of user devices for bridging the coverage gap by using device-to-device communication within the coverage gap.

2. The method of claim 1, further comprising: providing information to the user device of the dynamical updating of the one or more routes.

3. The method of claim 1, further comprising:
    receiving, from the user device, an acknowledgement that a user of the user device has selected a route from the one or more routes to travel on; and
    dynamically updating the selected route based on received information pertaining to experienced QoS associated with geographical locations pertaining to the selected route during transit of the user device on the selected route; and
    informing the user device of the dynamical updating of the selected route.

4. The method of claim 3, further comprising:
    informing the user device of the estimated QoS for geographical locations pertaining to the selected route for enabling the user device to plan its data usage based on the estimated QoS.

5. The method of claim 1, wherein estimating the QoS for the plurality of locations of the at least one route is based on one or more of: historical data pertaining to experienced QoS associated with the plurality of locations of the at least one route, live data reports gathered internally or externally from other entities in the communication network, weather reports, time stamps, date stamps, network congestion, number of user devices present on the at least one route, expected user device speed in transit, user device location, planned events, Reference Signal Received power (RSRP), Received Signal Strength Indication (RSS]), and Reference Signal Received Quality (RSRQ).

6. The method of claim 3, wherein dynamically updating the selected route during transit of the user from the starting point to the destination point is based on one or more of: network latency, live data reports gathered internally or externally from other entities in the communication network, weather reports, traffic reports, time stamps, date stamps, network congestion, number of user devices present on the selected route, user speed in transit, user device location, planned events, experienced QoS by the user device in relation to estimated QoS associated with locations pertaining to the selected route, Reference Signal Received power (RSRP), Received Signal Strength Indication (RSS]), and Reference Signal Received Quality (RSRQ).

7. The method of claim 1, further comprising communicating with the communication network to request reservation of network resources to the user device for providing the acceptable QoS during transit of the user from the starting point to the destination point.

8. The method of claim 1, further comprising, for providing the acceptable QoS, one or more of: redirecting other user devices in the network, applying edge computing at one or more network nodes located by the at least one route, decreasing travel speed of the user device and instructing the user device to travel the from starting point to the destination point at another point in time.

9. The method of claim 1, further comprising, for providing acceptable QoS, application of edge computing by:
    determining that one or more network nodes are deployed in a geographical close location to the one or more routes; and
    instructing to the determined one or more network nodes to run one or more computations associated with the determination of the acceptable QoS.

10. The method of claim 1, further comprising causing network load balancing by distributing suggested routes to a multitude of user devices traveling at the same time.

11. The method of claim 1, further comprising:
determining whether a user device is a prioritized user device and cause acceptable QoS by forcing of QoS enhancement when it is determined that the user device is a prioritized user.

12. The method of claim 11, further comprising:
forcing QoS enhancement by:
performing one or more of requesting network resources from other user devices, applying edge computing, requesting reservation of bandwidth, instructing other user devices to stop data usage, and redirecting other user devices away from the determined one or more routes.

13. A non-transitory computer-readable medium, comprising, stored thereupon, a computer program comprising program instructions configured such that, when the computer program is loaded into and run by a processor operating in a communication network, the computer program causes the processor to:
receive, from a user device in the communication network, a request signal indicative of a starting point, a destination point, an acceptable quality of service (QOS) for communications between the user device and the communication network during transit of the user device from the starting point to the destination point, and a transit time;
determine one or more routes from the starting point to the destination point based on transit time and on estimated QoS for communications between the user device and the communication network for a plurality of geographical locations of the one or more routes, in view of the acceptable QoS;
provide information of the determined one or more routes to the user device;
dynamically update the determined one or more routes based on received information pertaining to experienced QoS associated with geographical locations pertaining to the determined one or more routes during transit of the user device; and
based on at least one route being unable to be determined based on the acceptable QoS not being met due to a coverage gap in the network, redirect other user devices to the coverage gap to form a group of user devices for bridging the coverage gap by using device-to-device communication within the coverage gap.

14. A control node, operable in a communication network and comprising controlling circuitry configured to estimate quality of service (QOS) for geographical locations in the network, wherein the controlling circuitry is configured to:
receive, from a user device operating in the communication network, a request signal indicative of a starting point, a destination point, an acceptable QoS for communications between the user device and the communication network during transit of the user device from the starting point to the destination point, and a transit time,
determine one or more routes from the starting point to the destination point based on transit time and on estimated QoS for communications between the user device and the communication network for a plurality of geographical locations of the one or more routes, in view of the acceptable QoS;
provide information of the determined one or more routes to the user device;
dynamically update the determined one or more routes based on received information pertaining to experienced QoS associated with geographical locations pertaining to the determined one or more routes during transit of the user device; and
based on at least one route being unable to be determined based on the acceptable QoS not being met due to a coverage gap in the network, redirect other user devices to the coverage gap to form a group of user devices for bridging the coverage gap by using device-to-device communication within the coverage gap.

15. The control node of claim 14, wherein the controlling circuitry is further configured to:
provide information to the user device of the dynamical updating of the one or more routes.

16. The control node of claim 14, wherein the controlling circuitry is further configured to:
receive, from the user device, an acknowledgement that the user device has selected a
route from the at one or more routes to travel on;
dynamically update the selected route based on received information pertaining to experienced QoS associated with geographical locations pertaining to the selected route during transit of the user device on the selected route; and
provide information to the user device of the update of the selected route.

17. The control node of claim 16, wherein the controlling circuitry is further configured to provide information to the user device of the estimated QoS for geographical locations pertaining to the selected route, for enabling the user device to plan its data usage based on the estimated QoS.

18. The control node of claim 14, wherein the controlling circuitry is configured to estimate the QoS for the plurality of locations of the at least one route based on one or more of: historical data pertaining to experienced QoS associated with the plurality of geographical locations of the at least one route, live data reports gathered internally or externally from other entities in the communication network, weather reports, time stamps, date stamps, network congestion, number of user devices present on the at least one route, expected user device speed in transit, planned events, Reference Signal Received power (RSRP), Received Signal Strength Indication (RSS]), and Reference Signal Received Quality (RSRQ).

19. The control node of claim 16, wherein the controlling circuitry is configured to dynamically update the selected route during transit of the user device from the starting point to the destination point based on one or more of: network latency, live data reports gathered internally or externally from other entities in the communication network, weather reports, traffic reports, time stamps, date stamps, network congestion, number of user devices present on the selected route, user device speed in transit, user device location, experienced QoS by the user device in relation to estimated QoS associated with geographical locations pertaining to the selected route, Reference Signal Received power (RSRP), Received Signal Strength Indication (RSS]), and Reference Signal Received Quality (RSRQ).

* * * * *